(12) United States Patent
Muppalaneni et al.

(10) Patent No.: US 7,203,796 B1
(45) Date of Patent: Apr. 10, 2007

(54) METHOD AND APPARATUS FOR SYNCHRONOUS DATA MIRRORING

(75) Inventors: Nitin Muppalaneni, Santa Clara, CA (US); Abhijeet P. Gole, Campbell, CA (US); Michael L. Federwisch, San Jose, CA (US); Mark Smith, Cupertino, CA (US); Rajesh Sundaram, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 347 days.

(21) Appl. No.: 10/693,513

(22) Filed: Oct. 24, 2003

(51) Int. Cl.
*G06F 12/16* (2006.01)

(52) U.S. Cl. .................. 711/114; 711/162; 714/6; 714/5; 714/20

(58) Field of Classification Search ............... None
See application file for complete search history.

(56) References Cited

U.S. PATENT DOCUMENTS

| | | | |
|---|---|---|---|
| 5,636,360 A | 6/1997 | Courts et al. | |
| 5,687,390 A | 11/1997 | McMillan, Jr. | |
| 5,787,485 A | 7/1998 | Fitzgerald, V et al. | |
| 5,870,537 A | 2/1999 | Kern et al. | |
| 6,178,427 B1* | 1/2001 | Parker | 707/202 |
| 6,226,651 B1* | 5/2001 | Masuda et al. | 707/202 |
| 6,308,283 B1* | 10/2001 | Galipeau et al. | 714/6 |
| 6,499,112 B1 | 12/2002 | Milillo et al. | |
| 6,502,205 B1 | 12/2002 | Yanai et al. | |
| 6,578,160 B1* | 6/2003 | MacHardy et al. | 714/43 |
| 6,636,879 B1 | 10/2003 | Doucette et al. | |
| 6,671,705 B1 | 12/2003 | Duprey et al. | |
| 6,691,245 B1 | 2/2004 | DeKoning | |
| 6,728,898 B2 | 4/2004 | Tremblay et al. | |
| 6,735,603 B2 | 5/2004 | Cabrera et al. | |
| 6,745,303 B2 | 6/2004 | Watanabe | |
| 2002/0026603 A1 | 2/2002 | LeCrone et al. | |
| 2002/0083281 A1* | 6/2002 | Carteau | 711/161 |
| 2002/0138705 A1 | 9/2002 | Suzuki et al. | |
| 2002/0178335 A1 | 11/2002 | Selkirk et al. | |
| 2002/0194529 A1 | 12/2002 | Doucette et al. | |
| 2003/0005355 A1 | 1/2003 | Yanai et al. | |
| 2003/0014433 A1* | 1/2003 | Teloh et al. | 707/204 |
| 2003/0084242 A1 | 5/2003 | Strange et al. | |
| 2003/0167419 A1 | 9/2003 | Yanai et al. | |
| 2004/0073831 A1* | 4/2004 | Yanai et al. | 714/7 |
| 2004/0098637 A1 | 5/2004 | Duncan et al. | |
| 2004/0153719 A1 | 8/2004 | Achiwa et al. | |

(Continued)

*Primary Examiner*—B. James Peikari
(74) *Attorney, Agent, or Firm*—Blakely Sokoloff Taylor & Zafman LLP

(57) ABSTRACT

A synchronous data mirroring technique includes a log forwarding process and a consistency point (CP) process. During log forwarding, a source storage server receives write requests from clients, creates a log entry for each request in nonvolatile memory, and transmits each log entry to a destination storage server at a mirror site. The destination storage server writes each log entry to a file. If a primary volume becomes inaccessible due to a failure, the file is used to produce an updated mirror volume. The CP process includes updating a primary volume based on the write requests, and updating the mirror volume to reflect the updated primary volume. The mirror volume is updated by transmitting CP data from the source storage server to the destination storage server, and using the CP data to update the mirror volume through a network administration layer and a storage layer in the destination storage server.

18 Claims, 7 Drawing Sheets

U.S. PATENT DOCUMENTS

| | | |
|---|---|---|
| 2004/0153736 A1 | 8/2004 | Viswanathan et al. |
| 2004/0230756 A1* | 11/2004 | Achiwa et al. ............. 711/162 |
| 2004/0236983 A1 | 11/2004 | Burton et al. |
| 2004/0260970 A1 | 12/2004 | Beardsley et al. |
| 2004/0268177 A1 | 12/2004 | Ji et al. |
| 2005/0010592 A1 | 1/2005 | Guthrie |
| 2005/0021708 A1 | 1/2005 | Raghuraman et al. |

* cited by examiner

METHOD AND APPARATUS FOR SYNCHRONOUS DATA MIRRORING

RELATED APPLICATION

This application is related to co-pending U.S. patent application Ser. No. 10/692,495, entitled, "Synchronous Mirroring Including Writing Image Updates to a File," of A. Gole, filed on Oct. 24, 2003.

FIELD OF THE INVENTION

At least one embodiment of the present invention pertains to data storage and backup techniques, and more particularly, to a method and apparatus for performing synchronous data mirroring.

BACKGROUND

A file server is a type of storage server which operates on behalf of one or more clients to store and manage shared files in a set of mass storage devices, such as magnetic or optical storage based disks. As used herein, the term "file" should be interpreted broadly to include any type of data organization whether file-based or block-based. Further, as used herein, the term "file system" should be interpreted broadly as a programmatic entity that imposes structure on an address space of one or more physical or virtual disks so that an operating system may conveniently deal with data containers, including files and blocks. An "active file system" is a file system to which data can be both written and read, or, more generally, an active store that responds to both read and write I/O operations.

The mass storage devices associated with a file server are typically organized as one or more groups of Redundant Array of Independent (or Inexpensive) Disks (RAID). One configuration in which file servers can be used is a network attached storage (NAS) configuration. In a NAS configuration, a file server can be implemented in the form of an appliance, called a filer, that attaches to a network, such as a local area network (LAN) or corporate intranet. An example of such an appliance is any of the NetApp Filer products made by Network Appliance, Inc. in Sunnyvale, Calif.

A file server can be used to backup data, among other purposes. One particular type of data backup technique is known as "mirroring". Mirroring involves backing up data stored at a primary site by storing an exact duplicate (a mirror image) of the data at a remote secondary site. If data is ever lost at the primary site, it can be recovered from the secondary site.

A simple example of a network configuration for mirroring is illustrated in FIG. 1. A source filer 2 located at the primary site is coupled locally to a first set of mass storage devices 4, to a set of clients 1 through a local area network (LAN) 3, and to a destination filer 6 located at a remote mirror site through another network 7, such as a wide area network (WAN) or metropolitan area network (MAN). Each of the clients 1 may be, for example, a conventional personal computer (PC), workstation, or the like. The destination filer 6 located at the mirror site is coupled locally to a second set of mass storage devices 5 at the mirror site. The mass storage devices 4 and 5 may be, for example, conventional magnetic disks, optical disks such as CD-ROM or DVD based storage, magneto-optical (MO) storage, or any other type of non-volatile storage devices suitable for storing large quantities of data.

The source filer 2 receives various read and write requests from the clients 1. In a system which handles large volumes of client requests, it may be impractical to save data modifications to the mass storage devices every time a write request is received from a client. The reason for this is that disk accesses tend to take a relatively long time compared to other operations. Therefore, the source filer 2 may instead hold write requests in memory temporarily and concurrently forward them to the destination filer 6, and then save the modified data to the mass storage devices periodically, such as every few seconds or at whatever time interval is appropriate. The event of saving the modified data to the mass storage devices is called a "consistency point". At a consistency point, the source filer 2 saves any data that was modified by the write requests to its local mass storage devices 4 and also triggers a process of updating the data stored at the mirror site to reflect the updated primary volume. The process of updating the mirror volume is referred to as the "synchronization" or "sync" phase of the consistency point (CP) event, or simply "CP sync".

In this approach, there is an inherent risk (albeit small risk) of losing data modified after the last consistency point if a system failure occurs between consistency points. Consequently, in one prior art solution the source filer 2 maintains, in an internal non-volatile random access memory (NVRAM), a log of write requests received from clients since the last consistency point. This log is referred to herein as the "NVLog". The NVLog includes a separate entry for each write request received from a client. Each NVLog entry includes the data to be written according to the corresponding request. The NVLog is only used in the event of a failure, to recover data that would otherwise be lost. In the event of a failure, the NVLog is used to reconstruct the current state of stored data just prior to the failure. The NVLog is cleared and started anew after each consistency point is completed.

To protect against a failure of the source filer (including its NVLog), an approach called clustered failover (CFO) has been used in the prior art, in which a separate copy of the NVLog is also maintained in an NVRAM in the destination filer 6. The NVLog in the destination filer 6 is created by sending each NVLog entry, at the time the entry is created (i.e., in response to a request), from the source filer 2 to the destination filer 6. Upon receiving each NVLog entry from the source filer 2, the destination filer 6 creates a corresponding NVLog entry in its own NVRAM. FIG. 2 conceptually illustrates an example of a CFO configuration. As shown, in a CFO configuration each filer's disks are "visible" to the other filer (via high-speed interconnect). In the event a filer fails, the other filer takes over the ownership of the failed filer's disks and replay the NVLog contents mirrored from the failed filer. This CFO approach inherently requires accessibility to the failed site's disks. Therefore, the system does not work if a whole site (i.e., a filer and its associated disks) fails.

One solution which has been employed in the prior art to address this issue is to introduce another level of redundancy into the system, as illustrated conceptually in FIG. 3. To facilitate explanation, this approach is referred to as the "extended CFO" approach. In the extended CFO approach, instead of each filer maintaining one set of disks, each filer maintains two sets of disks, i.e., one set at its own location and one set at the remote location. If a disaster occurs and the primary site fails, an administrator can initiate failover to the mirror site. In that case the destination filer 6 breaks the mirror, separating its copy from the mirror and replaying any pending operations from its local NVLog.

An implementation of the extended CFO approach is illustrated in FIG. 4. As shown, the source and destination filers 2 and 6 are connected by a high-speed link, such as a FibreChannel arbitration loop (FCAL), which is used for mirroring both the NVLog and mirroring data. The FCAL link is implemented using FibreChannel switches 41 as well as FibreChannel-to-IP (Internet Protocol) and IP-to-Fibre-Channel conversion adapters 42 and 43, respectively, at each end. The source and destination filers 2 and 6 each have a remote direct memory access (RDMA) capable interconnect adapter card 44, which can communicate over the FCAL interconnect. This configuration enables the source filer 2 to directly access the disks 5 at the mirror site, in order to make RAID updates to the mirror volume. It also enables replication of NVLog on the destination filer 6.

The extended CFO approach also has shortcomings, however. FibreChannel switches and adapters are costly to acquire and maintain and make the system difficult to set up and administer. In addition, the mirror volume is updated only by the source filer sending input/output (I/O) commands directly to the mirror site's disks. As a result, the storage layer software (e.g., RAID) in the destination filer 6 has no knowledge of the mirror volume, such that the mirror volume cannot be reliably read by the destination filer 6 (or its clients, if any) during normal operation. For the same reason, errors in the mirror volume cannot be corrected by the destination filer 6.

Also, because the same software entity maintains both the primary volume and the mirror volume (e.g., the RAID software layer in the source filer 2), the disks 5 which store the mirror volume must have the same geometry (number and size of disks) as the disks 4 which store the primary volume. Consequently, the enhanced CFO approach is limited in flexibility.

Further, in at least one implementation of the extended CFO approach, NVRAM 45 in the destination filer 6 is divided into separate fixed-size partitions, one for the source filer's NVLog and one for the destination filer's NVLog. This partitioning has at least two disadvantages. First, it makes it impractical to have a CFO pair at both the primary site and the mirror site. Since NVRAM 45 is split into partitions, implementing CFO at both ends would require further partitioning of the NVRAM 45, making the implementation much more complex. Second, because the partitioning of NVRAM45 is static, the size of each partition is not necessarily optimal for the request load handled by the corresponding source.

The extended CFO approach also has other performance related disadvantages. As noted above, this approach transfers disk updates as well as the corresponding log entries from the primary site to the mirror site. The log entries tend to be more compact than the amount of disk level changes that they represent. Since mirroring is controlled by RAID on the source filer 2, it is also necessary to send checksum and exclusive-OR (XOR) data from the source filer 2 to the destination filer 6, which consumes network bandwidth and slows down system performance.

SUMMARY OF THE INVENTION

The present invention includes a method and apparatus for operating a destination storage server to mirror a primary volume maintained by a source storage server. In the method, multiple log entries are received at the destination storage server from the source storage server, the log entries representing write requests received by the source storage server. The received log entries are then written to a file at a mirror site. Data is received from the source storage server at a consistency point and is used to update a mirror volume at the mirror site via a storage access layer in the destination storage server. The log entries from the file are also used to update the mirror volume.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
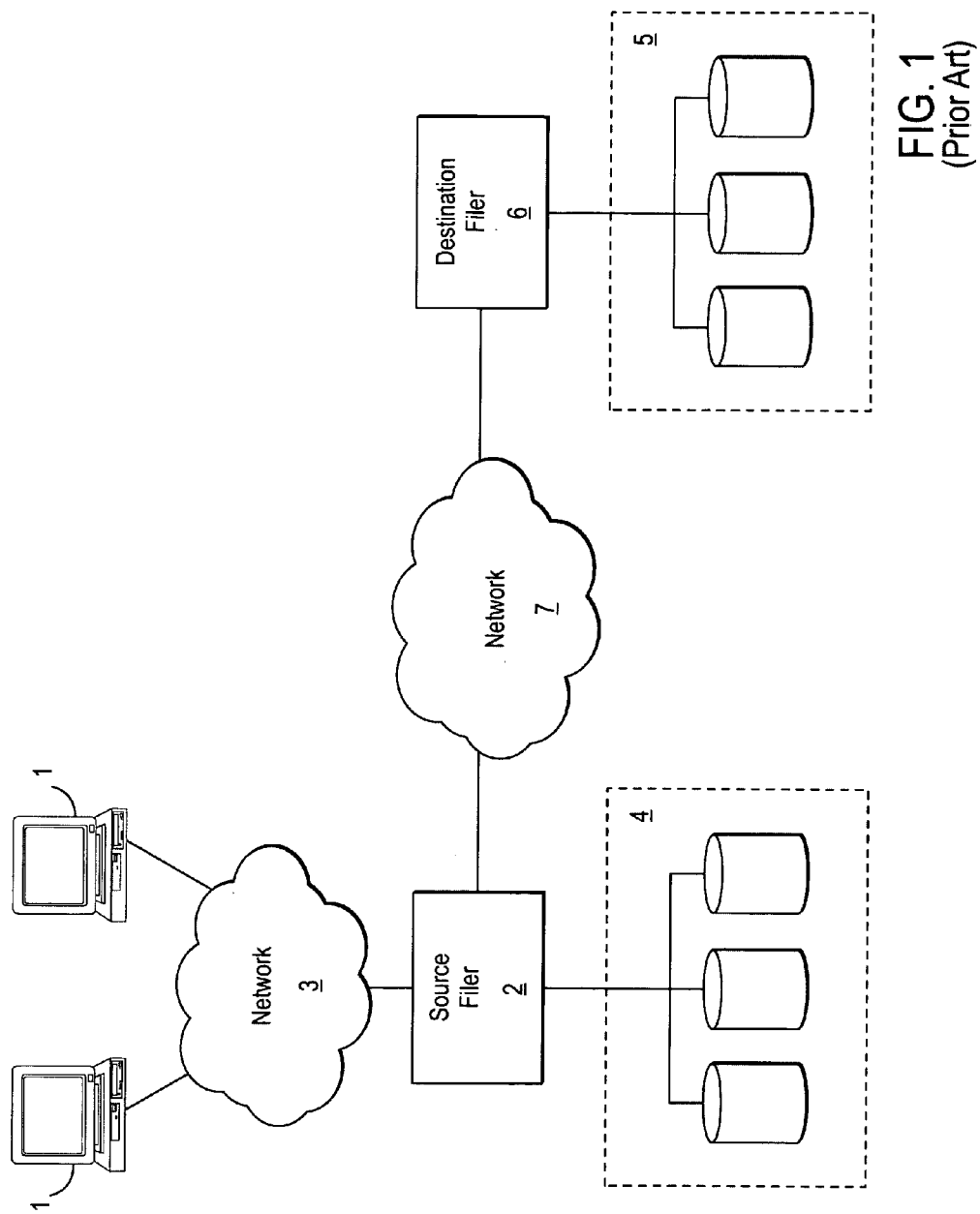
FIG. 1 illustrates an example of a network configuration to implement data backup using mirroring.
Figure 2:
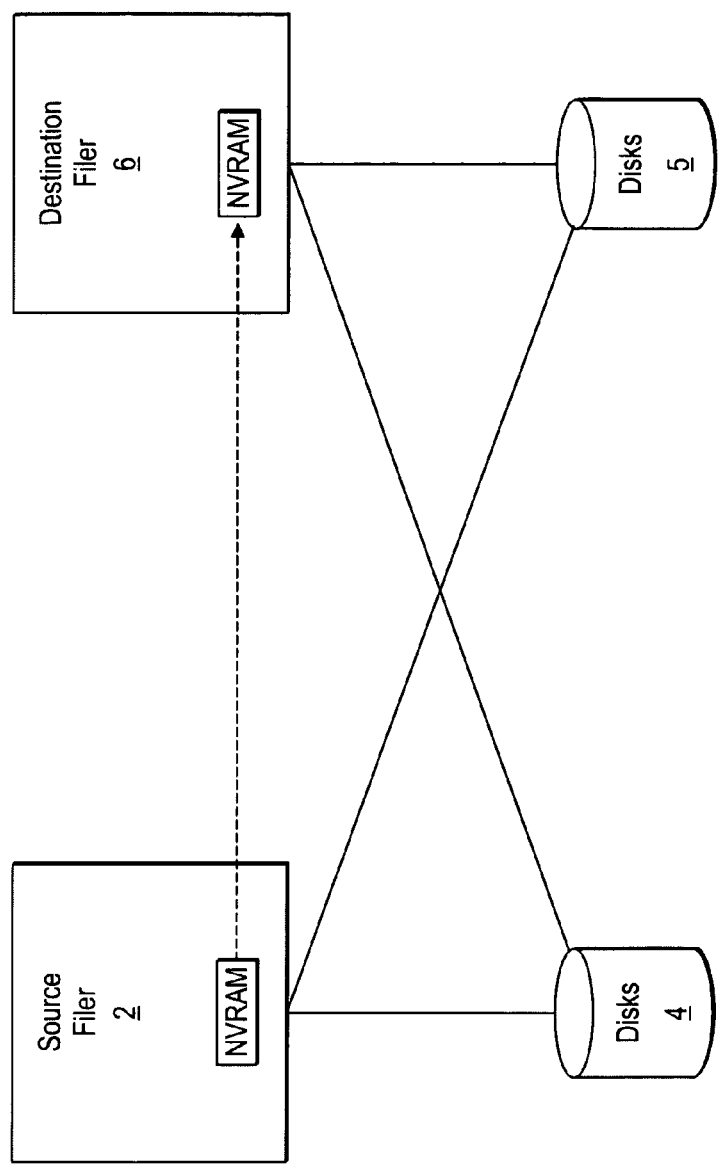
FIG. 2 illustrates a data storage system in a clustered failover (CFO) configuration.
Figure 3:
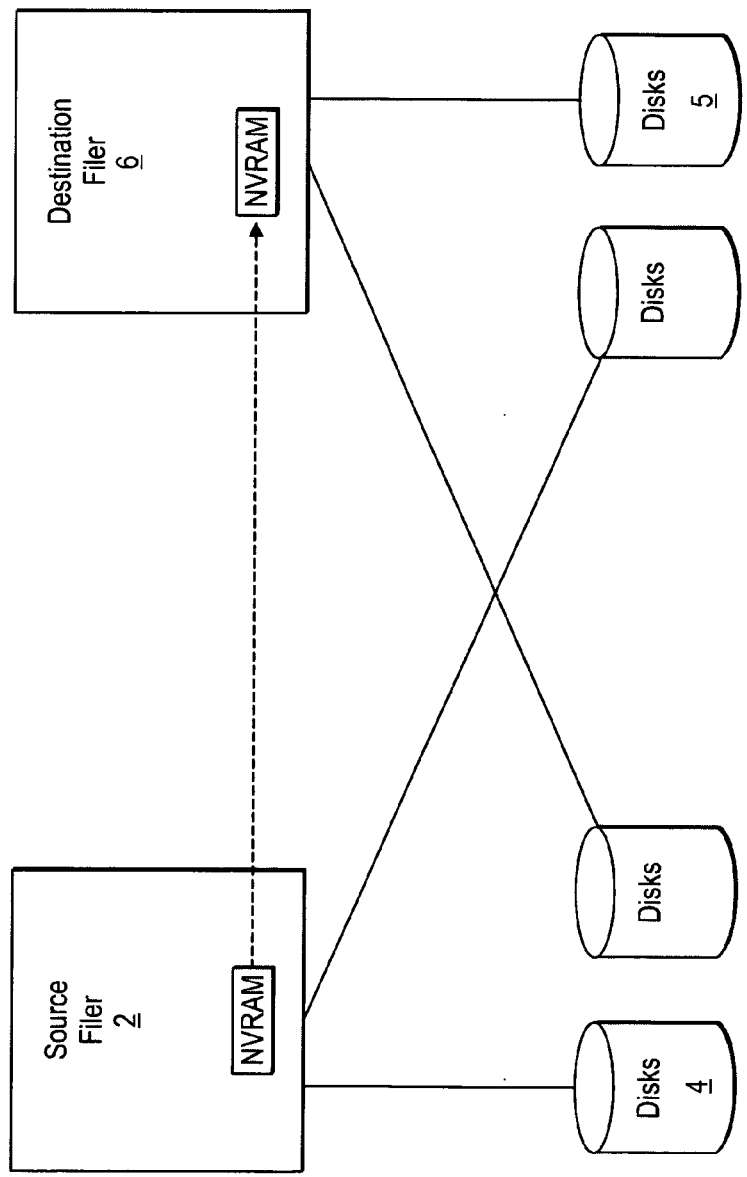
FIG. 3 illustrates a data storage system in an extended CFO configuration.
Figure 4:
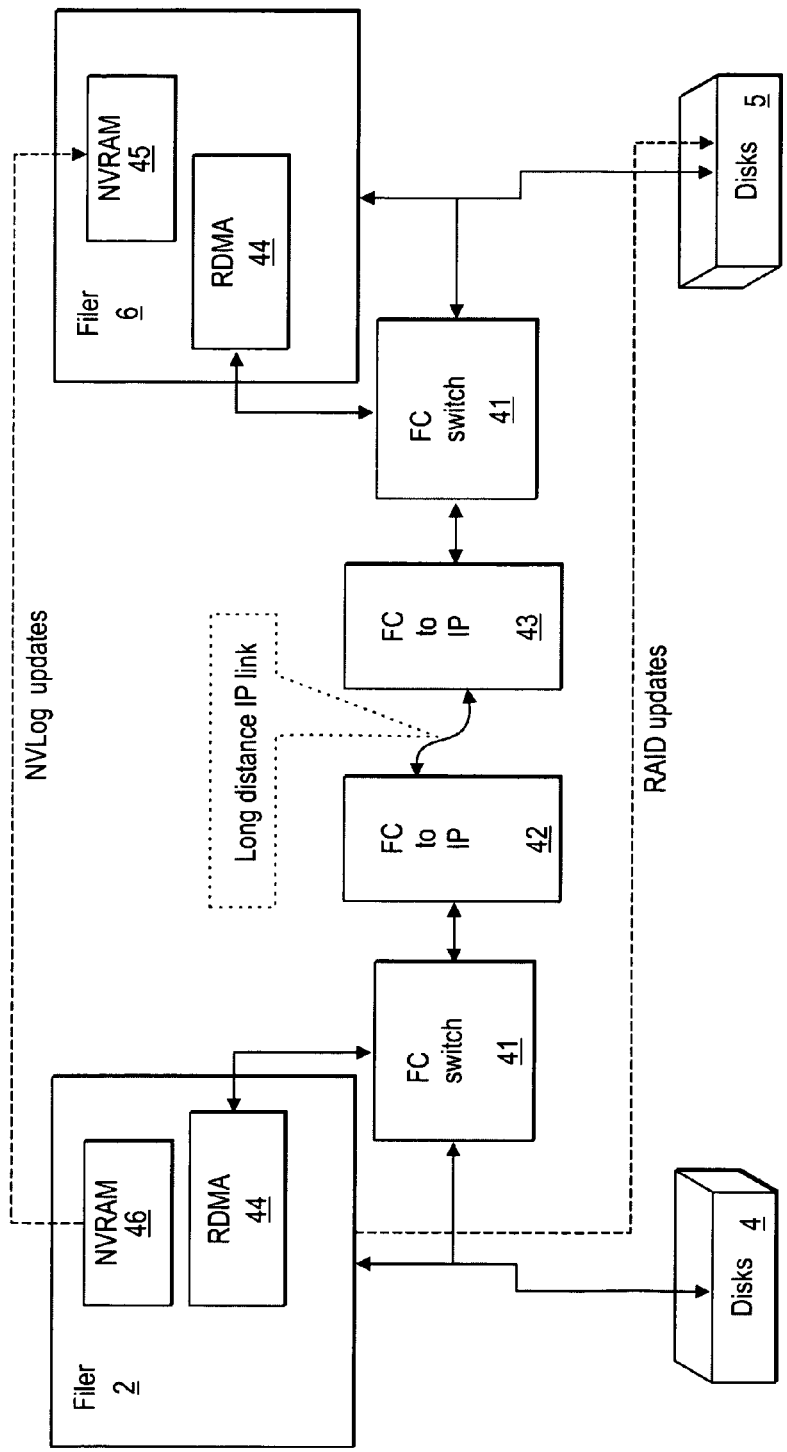
FIG. 4 illustrates an implementation of the extended CFO configuration of FIG. 3.

A method and apparatus for synchronous data mirroring are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

As described in greater detail below, a source storage server (which may be a filer) at a primary site receives various write requests from a set of clients, which are applied to a primary volume of data at the primary site. The source storage server logs each request in local non-volatile memory and forwards each log entry to a destination storage server (which may be a filer) located at a remote mirror site. The destination storage server writes each log entry to a local file corresponding to the source storage server which sent the log entry. If there are multiple source storage servers, then the log entries from each of them are stored in a separate file at the mirror site. In the event the primary volume becomes unavailable such that it becomes necessary to "fail over" to the mirror volume (e.g., in the event of a disastrous failure of the source filer), then entries from the log file can be replayed against the mirror volume to bring it up to date with what the clients of the source filer expect.

At a consistency point, the source storage server saves data, modified per the client requests, to its local set of mass storage devices, and triggers a process of synchronizing data stored at the mirror site with the data stored at the primary site. During this synchronization, the source storage server sends to the destination storage server consistency point (CP) data, which may include the modified blocks of data and/or references to the modified blocks. The destination storage server then uses the CP data to synchronize the mirror volume with the primary volume. In particular, mirroring functions are handled by network administration elements in both the source storage server and the destination storage server. During synchronization, the network administration element ("net admin") in the source storage server sends the CP data to the net admin in the destination storage server. The net admin in the destination storage server then communicates the CP data to the storage software layer, such as a RAID level-4 layer, in the destination storage server, which applies the changes to the mirror volume.

This approach provides a number of advantages over the prior art referred to above. First, it eliminates the need for costly switches and protocol adapters related to the use of FibreChannel. Secondly, because CP data is sent to the mirror site at a protocol level higher than the RAID level, conventional widely-used network protocols can be used to transmit the CP data, such as transfer control protocol/Internet Protocol (TCP/IP). Further, because updates to the mirror volume are accomplished through the storage (e.g., RAID) layer in the destination storage server (rather than by the source directly accessing the mirror site's disks), the destination storage server can provide reliable read-only access to the mirror volume and can detect and correct errors in the mirror volume. Furthermore, it is no longer necessary to propagate checksum and XOR data from the primary site to the mirror site, since these are now computed in the destination storage server. In addition, because the source storage server does not directly update the mirror volume, the storage devices that contain the mirror volume do not need to have the same geometry as the storage devices that contain the primary volume.

In addition, because NVLog entries are saved in a separate file for each source storage server, NVRAM on the destination storage server does not need to be partitioned into fixed-size regions as in the extended CFO approach. This allows the source and destination storage servers to be independently clustered, whereas the extended CFO approach is limited to single filer at the primary site and mirror site. Furthermore, the destination storage server can host mirror volumes for different source storage servers, and different primary volumes on a source can be mirrored on different destination storage servers. The storing of log entries into files on the destination filer, therefore, offers flexibility without compromising speed.

Figure 5:
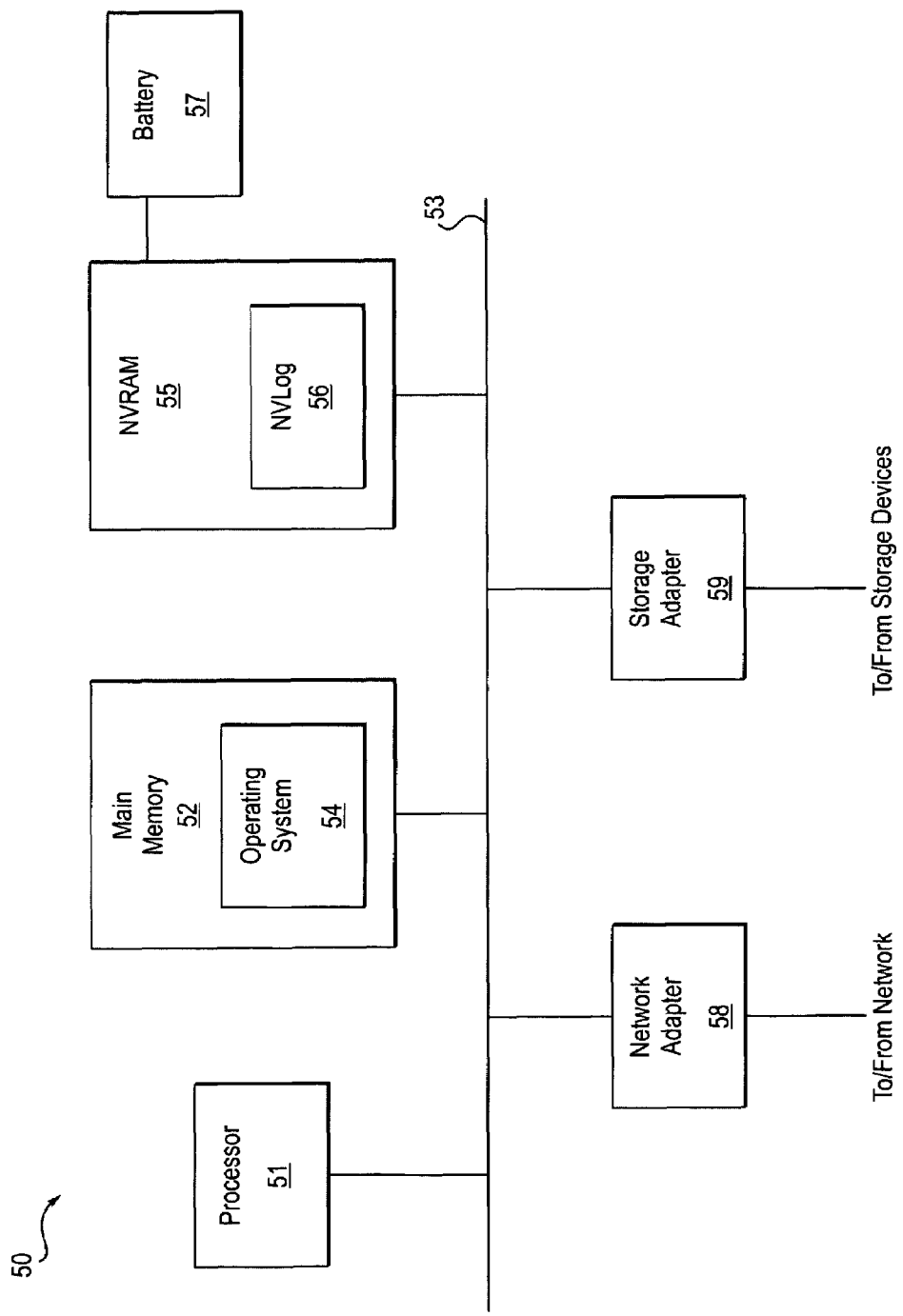
FIG. 5 is a conceptual block diagram of the architecture of a data storage server in accordance with the invention.

FIG. 5 shows the architecture of a storage server 50, which is representative of either a source storage server or a destination storage server used in a mirroring configuration according to embodiments of the invention. The source storage server and destination storage server each may be a filer, as henceforth assumed herein for purposes of explanation, although that is not necessarily so for purposes of implementing the invention. Note that certain standard and well-known components which are not germane to the present invention are not shown in FIG. 5. The filer 50 includes a processor 51 and main memory 52, coupled together by a bus system 53. The bus system 53 in FIG. 5 is an abstraction that represents any one or more separate physical buses and/or point-to-point connections, connected by appropriate bridges, adapters and/or controllers. The bus system 53, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor 51 is the central processing unit (CPU) of the filer 50 and, thus, controls the overall operation of the filer 50. In certain embodiments, the processor 51 accomplishes this by executing software stored in main memory 52. The processor 51 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The main memory 52, which is generally some form of random access memory (RAM), stores the operating system 54 of the filer 50. Techniques of the present invention may be implemented within the operating system 54, as described further below. Also coupled to the processor 51 through the bus system 53 is another memory, i.e., an NVRAM 55. The NVRAM 55 stores an NVLog 56, such as described above. The NVRAM 55 may be formed by a conventional form of RAM coupled to an uninterruptible backup power source such as a battery 57.

Also connected to the processor 51 through the bus system 53 are a network adapter 58 and a storage adapter 59. The network adapter 58 provides the filer 50 with the ability to communicate with remote devices, such as clients and/or another filer, over a network and may be, for example, an Ethernet adapter. The storage adapter 59 allows the filer to access the external mass storage devices and may be, for example, a Fibre Channel adapter or SCSI adapter.

Figure 6:
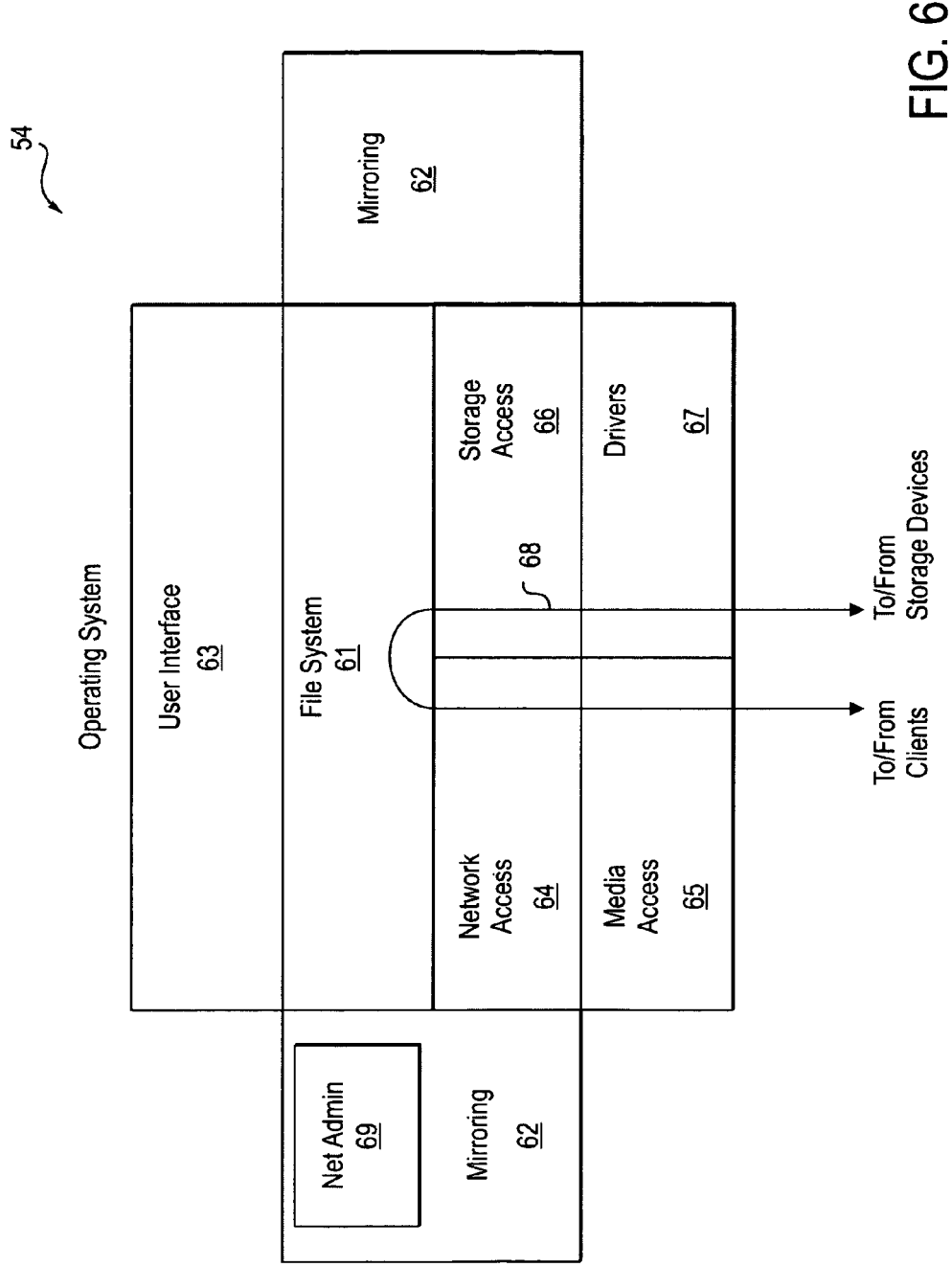
FIG. 6 is a block diagram of the operating system of a data storage server in accordance with the invention.

FIG. 6 illustrates a logical view of the operating system 34 of the filer 50, according to certain embodiments of the invention. As can be seen, the operating system 54 includes a number of layers. The core of the operating system 54 is the file system 61 which, among other responsibilities, executes read and write operations on the mass storage devices in response to client requests, maintains directories, and manages consistency point operations. An example of a file system suitable for this purpose is the Write Anywhere File Layout to (WAFL) file system from Network Appliance, such as used in the NetApp Filers. The file system 61 operates on blocks of data of a predetermined size, such as 4 kbytes. Also shown in FIG. 6 is the logical data path 68 from clients to mass storage devices, through the file system 61.

Above the file system 61, the operating system 54 also includes a user interface 63, through which a network administrator or other user can control and/or configure the filer (e.g., remotely from a management station). The user interface 63 may generate a command line interface and/or a graphical user interface for this purpose.

Below the file system 61, on the network side the operating system 54 includes a network layer 64 and, at the lowest level, a media access layer 65. The network access layer 64 implements any of various protocols used to communicate with client devices, such as network file system (NFS), common Internet file system (CIFS) and/or hypertext transport protocol (HTTP). The media access layer 65 includes one or more drivers which implemented the protocols used to communicate over the network, such as Ethernet.

Below the file system 61 on the storage device side, the operating system 54 includes a storage access layer 66 and, at the lowest level, a driver layer 67. The storage access layer 66 implements a disk storage protocol such as RAID, while the driver layer 67 implements a lower-level storage device access protocol, such as Fibre Channel or SCSI.

The operating system of 54 also includes a mirroring module 62, which is operatively coupled to the file system 61 and the storage access layer 66 on the storage device side, and to the file system 61 and the network access layer 64 on the network side. The mirroring module 62 controls the synchronization of data at the remote secondary site with data stored at the primary site. On the network side the mirroring module 62 includes a net admin component 69 which implements at least some of the techniques introduced herein. The net admin 69 is at the same logical level as the file system 61. The net admin 69 is responsible for communicating volume block number (VBN) updates between the source and destination filer during CP sync. This is in contrast with prior art techniques mentioned above, in which CP sync was carried out by RAID software in the source filer sending RAID updates directly to the destination filer's disks over FibreChannel.

Figure 7:
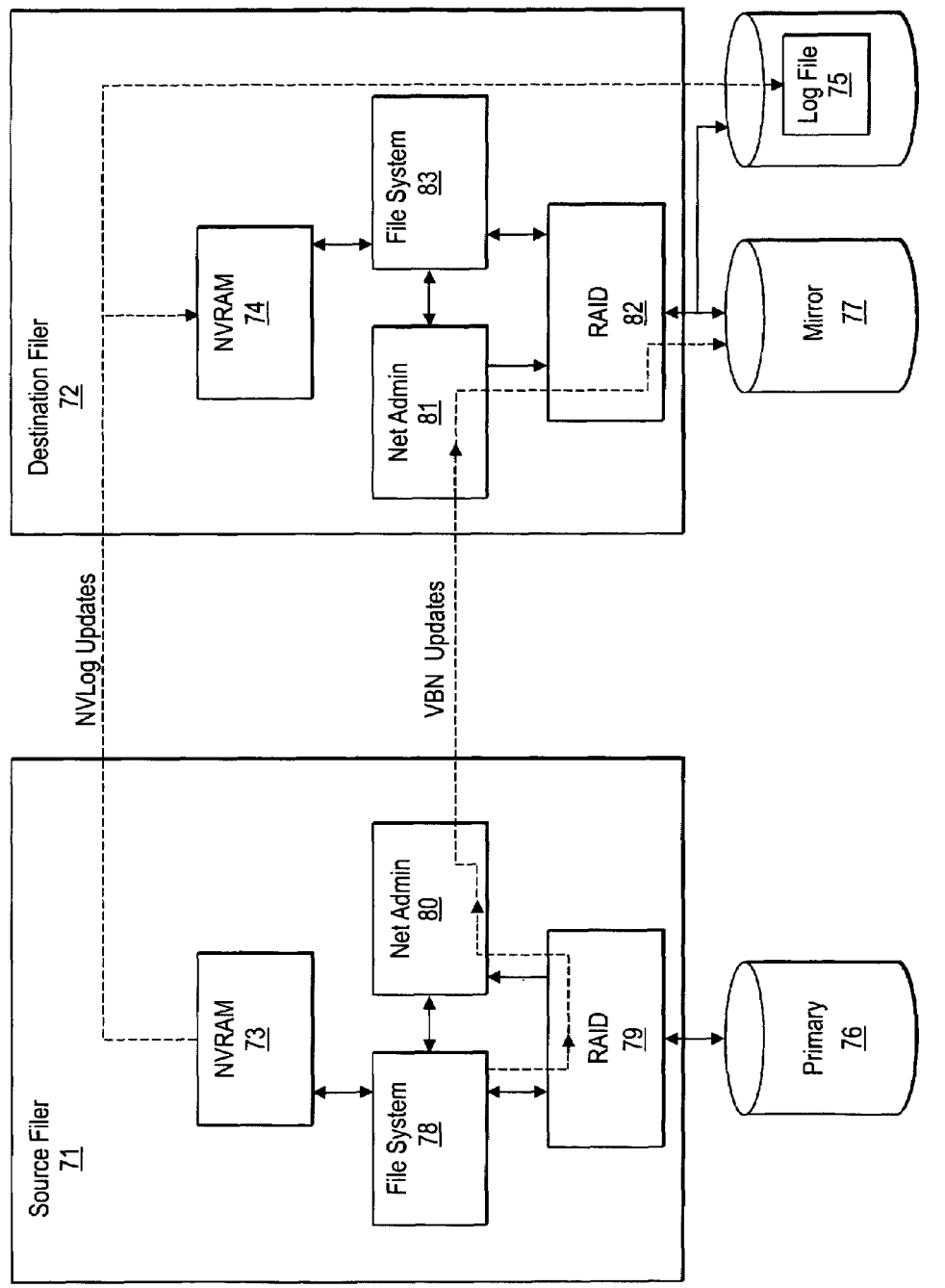
FIG. 7 illustrates two data storage servers performing synchronous data mirroring in accordance with the invention.

FIG. 7 illustrates aspects of the invention in greater detail. A source filer 71 at a primary site and a destination filer 72 at a remote mirror site each may have an architecture such as shown in FIG. 5 and an operating system such as shown in FIG. 6. The source filer 71 and the destination filer 72 each includes its own NVRAM 73 and 74, respectively, for storing NVLog entries. The source filer 71 receives various write requests from a set of clients (not shown), which are applied to a primary volume 76 of data at the primary site. The source filer 71 logs each request in its NVRAM 73 and forwards each log entry to the destination filer 72.

The mirroring carried out by the illustrated system is synchronous, in that only when a log entry has been successfully received and stored by the destination filer 72 does the destination filer 72 send an acknowledgment to the source filer 71, which in turn sends an acknowledgment to the client that submitted the corresponding write request.

In contrast with the prior art mentioned above, the NVRAM 74 in the destination filer is not partitioned into separate regions for each filer. Instead, the mirroring module 62 in the destination filer 72 writes each log entry to a local file 75 corresponding to the source filer 71 which sent the log entry. If there are multiple source filers 71, then the log entries from each source filer 1 are stored in a separate file at the mirror site. Each log file 75 may be contained in main memory (e.g., RAM) of the destination filer 72, a disk of the destination filer 72, or both. In one implementation, the log file 75 is write allocated and written to disk when a CP sync occurs on the destination filer 72. In addition, the file system 83 in the destination filer 72 writes each log entry to the NVRAM 74 in the destination filer 72 when it processes the corresponding write request. All log entries received by the destination filer 72 are stored together in (non-partitioned) NVRAM 74, regardless of the source filer (if there is more than one source filer) from which they were sent. In the event the primary volume 76 becomes unavailable such that it becomes necessary to "fail over" to the mirror volume 77 (e.g., in the event of a disastrous failure of the source filer 71), then entries from the log file 75 can be replayed against the mirror volume 77 to bring it up to date with what the clients of the source filer 71 expect.

This approach provides advantages over the prior art discussed above. In particular, because NVLog entries are saved in a separate file for each source storage server, NVRAM on the destination storage server does not need to be partitioned into fixed-size regions as in the extended CFO approach. This allows more optimal usage of NVRAM space in the destination filer 72. In addition, the source and destination storage servers to be independently clustered, whereas the extended CFO approach is limited to single filer at the primary site and mirror site. Furthermore, the destination storage server can host mirror volumes for different source storage servers, and different primary volumes on a source can be mirrored on different destination storage servers. The storing of log entries into files on the destination filer, therefore, offers flexibility without compromising speed.

Various refinements and modifications can be made to the above-described technique. For example, it may be desirable to partition NVRAM 73 in the source filer 71 to facilitate the transfer of data to disks. More specifically, in one embodiment at least two partitions are created in NVRAM 73 in the source filer 71. A separate NVLog file 75 is maintained at the mirror site for each partition of NVRAM 73. When one partition of NVRAM 73 becomes full, a consistency point is triggered on the source filer 71, and any further write requests received by the source filer 71 are logged in the other partition, at least until the consistency point has been completed and the first partition has been flushed. At the mirror site, the destination filer 72 stores each of the log entries it receives in the appropriate one of multiple NVLog files 75 it maintains, depending on: 1) which source filer 71 sent the log entry (if there is more than one source filer) and 2) in which partition of the source filer's NVRAM 73 the log entry was logged at the primary site. Additional details regarding how NVLog entries can be managed advantageously are described in co-pending U.S. patent application Ser. No. 10/692,495, entitled, "Synchronous Mirroring Including Writing Image Updates to a File," of A. Gole, filed on Oct. 24, 2003, the entire disclosure of which is incorporated herein by reference.

At a consistency point, the source filer 71 updates the primary volume 76 according to the client requests received since the last consistency point and triggers a process of synchronizing the mirror volume 77 with the updated primary volume 76 (CP sync). During CP sync, the source filer 71 sends to the destination filer 72 consistency point (CP) data, which may include modified blocks of data and/or references to modified blocks, and which may be sent in the form of datagrams. The references to modified blocks may be references to data contained in the log file 75. The destination filer 72 then uses the CP data to synchronize the mirror volume 77 with the primary volume 76. In particular, CP sync is triggered on the source filer 71 by the file system 78, which sends CP data to its RAID layer 79. The RAID layer 79 on the source filer 71 generates disk I/O commands to apply the updates to the (local) primary volume 76. In addition, the RAID layer 79 on the source filer 71 passes the VBN updates to the net admin 80 in the source filer 71. The net admin 80 in the source filer 71 sends the VBN updates to the corresponding net admin 81 in the destination filer 72, using a standard network protocol such as TCP/IP. The net admin 81 in the destination filer 72 passes the VBN updates to the RAID layer 82 in the destination filer 72, which updates the mirror volume 77 accordingly.

The address space of the file system 78 in the source filer 71 and the file system 83 in the destination filer 72 is only a VBN address space. The manner in which the RAID levels 79 and 82 implement this address space is transparent to the file systems 78 and 83. Thus, a RAID volume (primary or mirror) is treated by the file system as a virtual container of data. Checksums and XOR data are computed independently on the source filer 71 and the destination filer 72 for purposes of error detection and correction, which saves network bandwidth.

This approach provides numerous advantages over the prior art referred to above. For example, this approach eliminates the need for costly switches and protocol adapters for FibreChannel. Also, CP data is sent to the mirror site at a protocol level higher than the RAID level, so a conventional widely-used network protocol such as TCP/IP can be used to transmit the CP data. Because updates to the mirror volume are accomplished through the RAID layer 82 in the destination filer 72 (not by the source filer 71 directly accessing the mirror site's disks), the destination filer 72 can provide reliable read-only access to the mirror volume 77 and can detect and correct errors in the mirror volume 77. Furthermore, bandwidth consumption is reduced, since it is not necessary to propagate checksum and XOR data from the source filer 71 to the destination filer 72. In addition, because the source filer 71 does not directly update the mirror volume, the storage devices that contain the mirror volume 77 do not need to have the same geometry as the storage devices that contain the primary volume 76.

The techniques introduced above have been described in the context of a NAS environment. However, these techniques can also be applied in various other contexts. For example, the techniques introduced above can also be applied in a direct attached storage (DAS) environment or in a storage area network (SAN) environment. A SAN is a highly efficient network of interconnected, shared storage devices. One difference between NAS and SAN is that in a SAN, the storage server (which may be a network-attached appliance) provides a remote host with block-level access to stored data, whereas in a NAS configuration, the storage server provides clients with file-level access to stored data. Thus, the techniques introduced above are not limited to use in a file server or in a NAS environment.

Thus, a method and apparatus for synchronous data mirroring have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operating a destination storage server to mirror a primary volume maintained by a source storage server, the method comprising:
   receiving, at the destination storage server, a plurality of log entries from the source storage server, the plurality of log entries representing write requests received by the source storage server;
   writing the received log entries to a file maintained by the destination storage server;
   receiving, at the destination storage server, data from the source storage server during a synchronization phase of a consistency point, the consistency point being one of a plurality of regularly occurring consistency points, each characterized by the saving of data specified by write requests in a set of non-volatile storage devices managed by a RAID layer in the source storage server and in a set of non-volatile storage devices managed by a RAID layer in the destination storage server, wherein said data received at the destination storage server from the source storage server during the synchronization phase of the consistency point include volume block number updates from the source storage server;
   using the data received at the destination storage server from the source storage server during the synchronization phase of the consistency point, including the volume block number updates, to update a mirror volume maintained by the destination storage server, via the RAID layer in the destination storage server; and
   using log entries from the file to update the mirror volume.

2. A method as recited in claim 1, wherein said receiving the data from the source storage server comprises receiving the data via TCP/IP.

3. A method as recited in claim 1, wherein said using log entries from the file to update the mirror volume is done at the consistency point in conjunction with said using the data to update the mirror volume.

4. A method as recited in claim 1, wherein said using log entries from the file to update the mirror volume is done in response to a failure that renders the primary volume inaccessible.

5. A method of mirroring data, the method comprising:
   at a source storage server, receiving a plurality of write requests from a set of clients;
   creating log entries for the write requests in the source storage server;
   transmitting the log entries to a destination storage server at a mirror site;
   writing the log entries to a file corresponding to the source storage server in the destination storage server; and
   at a consistency point of a plurality of regularly occurring consistency points,
      causing a primary volume implemented in a set of non-volatile storage devices maintained by a RAID layer in the source storage server to be updated based on the write requests, and
      during a synchronization phase of the consistency point, causing a mirror volume implemented in a set of non-volatile storage devices maintained by a RAID layer in the destination storage server at the mirror site to be updated to reflect the updated primary volume, by
         transmitting consistency point data from the source storage server to the destination storage server, the consistency point data including volume block number updates from the source storage server,
         receiving the consistency point data at the destination storage server,
         updating the mirror volume through the RAID layer in the destination storage server based on the received consistency point data, and
         using log entries from the file to update the mirror volume.

6. A method as recited in claim 5, wherein said receiving the consistency point data at the destination storage server comprises receiving the consistency point data via TCP/IP.

7. A method as recited in claim 5, wherein said using log entries from the file to update the mirror volume is done at the consistency point in conjunction with said using the consistency point data to update the mirror volume.

8. A method as recited in claim 5, wherein said using log entries from the file to update the mirror volume is done in response to a failure that renders the primary volume inaccessible.

9. A method of mirroring data, the method comprising:
   performing a log forwarding process that includes at a source file server, receiving a plurality of write requests from a set of clients, creating a log entry for each of the write requests in a nonvolatile memory in the source file server, transmitting the log entry for each of the write requests to a destination file server at a mirror site, and writing the log entry to a file of log entries corresponding to the source file server in the destination file server;

at a consistency point of a plurality of regularly occurring consistency points, performing a data synchronization process that includes causing a RAID primary volume implemented in a set of disks maintained by the source file server to be updated based on the write requests, by communicating through a RAID software layer in the source file server, and causing a RAID mirror volume implemented in a set of disks maintained by the destination file server at the mirror site to be updated to reflect the updated RAID primary volume, by transmitting consistency point data from the source file server to the destination file server, the consistency point data including volume block number updates from the source file server, receiving the consistency point data at the destination file server, and updating the RAID mirror volume through a RAID software layer in the destination file server based on the received consistency point data; and using log entries from the file to update the RAID mirror volume.

10. A method as recited in claim 9, wherein said transmitting consistency point data from the source file server to the destination file server comprises transmitting the consistency point data from the source file server to the destination file server using TCP/IP.

11. A method as recited in claim 9, wherein said using log entries from the file to update the RAID mirror volume is done at the consistency point in conjunction with updating the RAID mirror volume based on the received consistency point data.

12. A method as recited in claim 9, wherein said using log entries from the file to update the mirror volume is done in response to a failure that renders the primary volume inaccessible.

13. A storage server comprising:

a network interface to communicate with a remote storage server;

a RAID layer to maintain a mirror volume of data reflecting a primary volume of data maintained by the remote storage server;

a file system to receive a plurality of log entries from the remote storage server, the log entries representing write requests received by the remote storage server from a set of clients, wherein the file system layer further is to write the log entries to a file and, in the event of a failure, to use the file update a mirror volume of the primary volume; and a network administration unit to receive consistency point data from the remote storage server at a consistency point of a plurality of regularly occurring consistency points, each consistency point characterized by the saving of data specified by write requests in a set of non-volatile storage devices managed by the RAID layer in the storage server and in a set of non-volatile storage devices managed by a RAID layer in the remote storage server, wherein the received consistency point data include volume block number updates from the remote storage server, the network administration unit further to respond to the received consistency point data by causing the RAID layer to use the consistency point data to update the mirror volume.

14. A storage server as recited in claim 13, wherein the network administration unit is at the same logical level as the file system layer.

15. A storage server as recited in claim 13, wherein the consistency point data is received from the remote storage server via TCP/IP.

16. A storage server as recited in claim 13, wherein the file system uses the file to update the mirror volume at the consistency point in conjunction with using the consistency point data to update the mirror volume.

17. A storage server as recited in claim 13, wherein the file system uses the file to update the mirror volume in response to a failure that renders the primary volume inaccessible.

18. An apparatus for mirroring data, the apparatus comprising:

means for receiving a plurality of log entries from a remote storage server, the plurality of log entries representing write requests received by the remote storage server;

means for writing the log entries to a file;

means for receiving consistency point data from the remote storage server at a consistency point of a plurality of regularly occurring consistency points, each consistency point characterized by the saving of data specified by write requests in a set of non-volatile storage devices managed by a RAID layer in a local storage server and in a set of non-volatile storage devices managed by a RAID layer in the remote storage server, wherein the received consistency point data include volume block number updates from the remote storage server, means for using the consistency point data, including the volume block number updates, to update a mirror volume through the RAID software layer in the local storage server, and means for using the log entries in the file to update the mirror volume.

* * * * *